United States Patent

[11] 3,626,371

[72] Inventors Jacques Marcel Hennes
Paris;
Marc Jean Pierre Leger, Issy-les-Moulineaux; Claude Paul Henri Lerouge, Maurepas, all of France

[21] Appl. No. 845,983
[22] Filed July 30, 1969
[45] Patented Dec. 7, 1971
[73] Assignee International Standard Electric Corporation
New York, N.Y.
[32] Priority Aug. 1, 1968
[33] France
[31] 161427

[54] SCANNING CIRCUIT FOR ELECTRONIC MULTISELECTORS HAVING MOS TRANSISTOR MATRIX
7 Claims, 7 Drawing Figs.

[52] U.S. Cl. .................................................. 340/166, 340/147
[51] Int. Cl. .................................................. H04g 1/00, H04g 3/00
[50] Field of Search .................................................. 340/166

[56] References Cited
UNITED STATES PATENTS

| | | | |
|---|---|---|---|
| 3,165,719 | 1/1965 | Mueller | 340/166 |
| 3,435,138 | 3/1969 | Borkan | 340/166 X |
| 3,465,293 | 9/1969 | Weckler | 340/166 |
| 3,470,533 | 9/1969 | Tanner | 340/166 |
| 3,518,627 | 6/1970 | Meyer | 340/166 |

*Primary Examiner*—Harold I. Pitts
*Attorneys*—C. Cornell Remson, Jr., Walter J. Baum, Percy P. Lantzy, J. Warren Whitesel, Delbert P. Warner and James B. Raden

ABSTRACT: An electronic scanning circuit is provided using MOS integrated switches to set up electronic multiselectors. The electronic multiselectors are in the form of matrices of verticals and horizontals having MOS transistors forming the crosspoints.

Inventors
J.M. HENNES M.J.P. LEGER
C.P.H LEROUGE
By D. O. Warner
Attorney

SCANNING CIRCUIT FOR ELECTRONIC MULTISELECTORS HAVING MOS TRANSISTOR MATRIX

The present invention is related to a scanning circuit which sets up electronic multiselectors for switching network in which the contacts located at the cross-points are made up of field effect transistors.

A multiselector of this type which comprises *m* verticals and *n* horizontals has been described in the case P. Girard, M. J. P. Leger, C. P. H. Lerouge, J. H. Dejean 10—4—14—17 U.S. Pat. application No. 819,700, filed Apr. 28, 1969.

It will be briefly reminded that in such a multiselector, each switching circuit located at the cross-point between two perpendicular speech conductors made up of a vertical *j* and a horizontal *k* of the multiselector comprises first, a contact element made up of a field effect transistor with insulated grid the source and the drain of which are connected respectively to the vertical *j* and to the horizontal *k* considered and second, a holding flip-flop comprising transistors of the same type the 1 output terminal of which is connected to the switching transistor grid so that, when the said flip-flop is in the 1 state, the said transistor is conducting ("low impedance on" state) which corresponds to the closing of a contact connecting the conductors *j* and *k*.

It will be observed that a cross-point may comprise several contact elements controlled by one same holding flip-flop. In case of a multiselector for switching network, the cross-point comprises four contact elements, two per speech direction.

A matrix of an elementary multiselector comprises *m* verticals and *n* horizontals to which are associated as many selection conductors. The selection of the vertical *j* is carried out by the application of a signal C*j* to the vertical selection conductor *cj;* the selection of the horizontal *k* is carried out by the application of a signal $\overline{Sk}$ to the horizontal selection conductor *sk*. Moreover the matrix comprises on the one hand, *n* busy state conductors *e*1, *e*2 ... *ek* ... *en* associated to the horizontals, a signal E*k* appearing on the conductor *ek* when at least one contact is closed on the said horizontal and on the other hand, *n* free horizontal conductors *e*'1, *e*'2 ... *e'k* ... *e'n* associated to the horizontals, a signal E'k appearing on the conductor *e'k* when all the contacts of the said horizontal are open. At the rest state, signals $\overline{Cj}$ and S*k* are applied to the selection inputs in such a way that the state of the holding flip-flop may not be changed; an inverter circuit to which is applied the signal C*j* supplies a signal $\overline{C'j}$ delayed by an amount of time *t* slightly higher than the switching time of the holding flip-flop.

The matrices of the elementary multiselectors may be manufactured in large scale integrated circuits the cost price of which is all the lower as the number of circuits manufactured is higher; therefore, it is interesting to apply this multiselector to a great number of uses.

The object of the present invention is thus to realize a scanning circuit which sets up a multiselector.

According to one feature of the present invention, an electronic scanning circuit is made up of a multiselector comprising *m* verticals and *n* horizontals in which the free horizontal conductor *e'k* associated to the horizontal *k* is connected to the selection conductor *sk*+1 associated to the horizontal *k*+1.

The above-mentioned and other features and objects of this invention will become apparent by reference to the following description taken in conjunction with the accompanying drawings in which.

Figure 2:
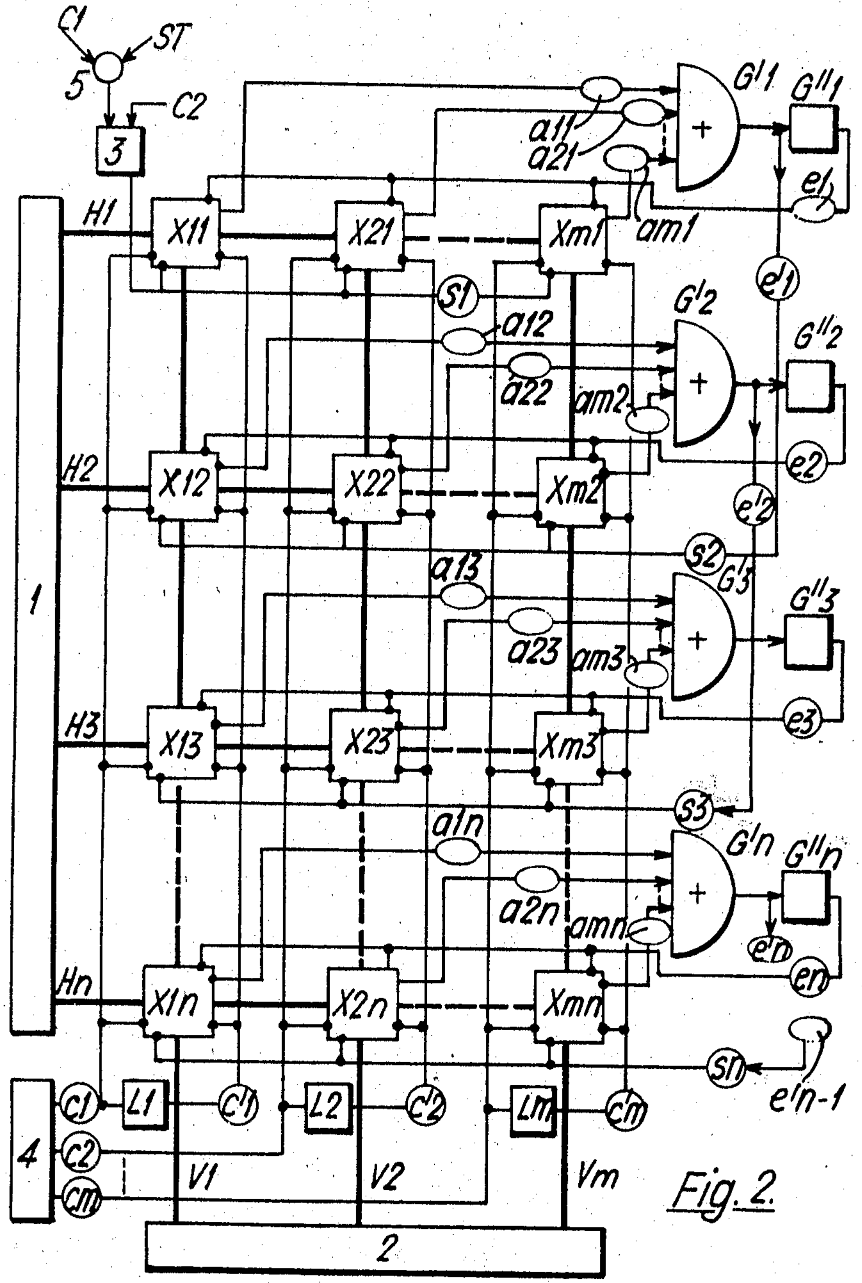
FIG. 2 illustrates the diagram of a scanning circuit with one single stage.
Figure 4:
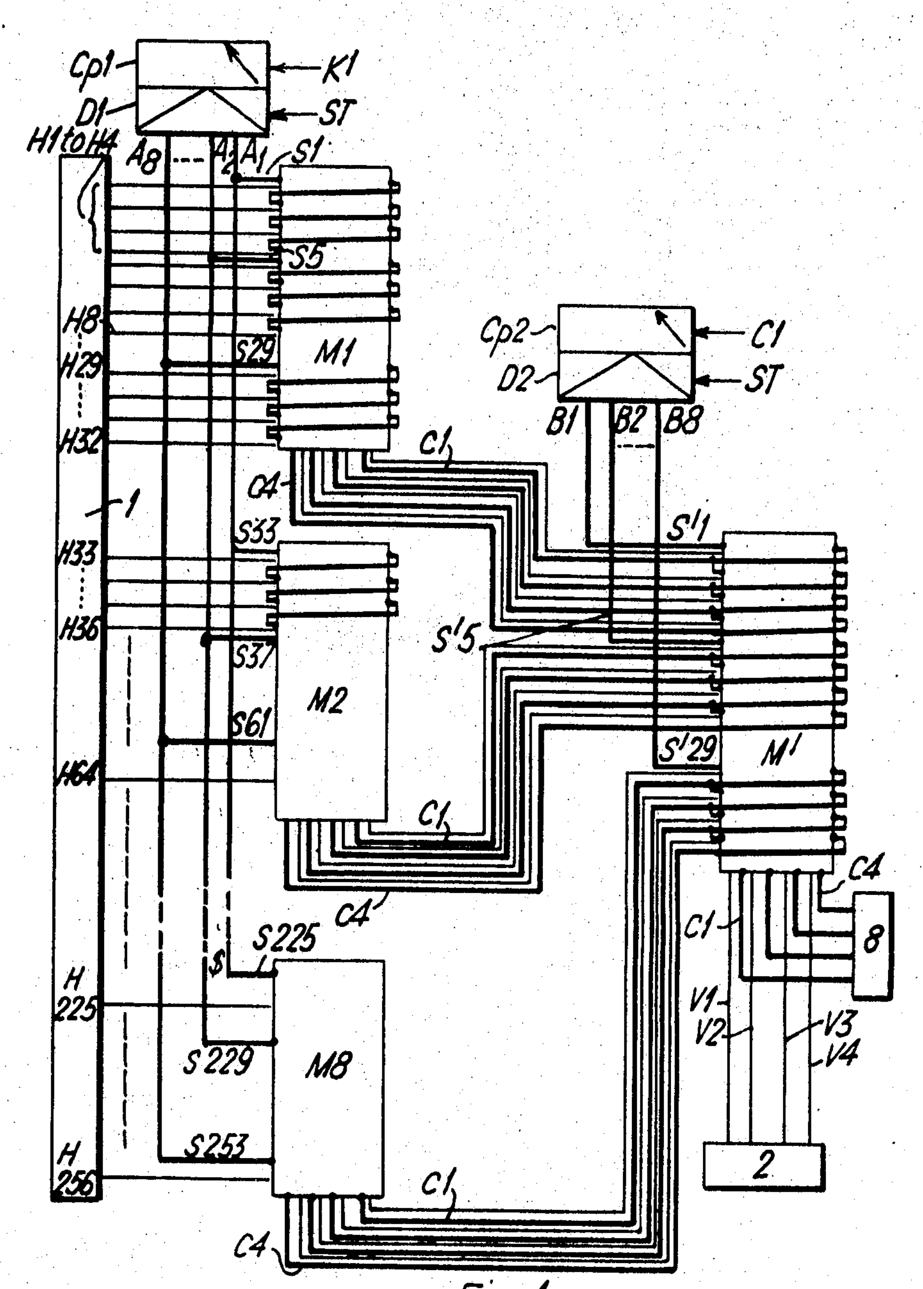

FIG. 3*a* to 3*d* illustrate the diagram of the control signals of the scanning circuit of FIG. 2;

FIG. 4 illustrates the diagram of a scanning circuit with two stages.

Figure 1:
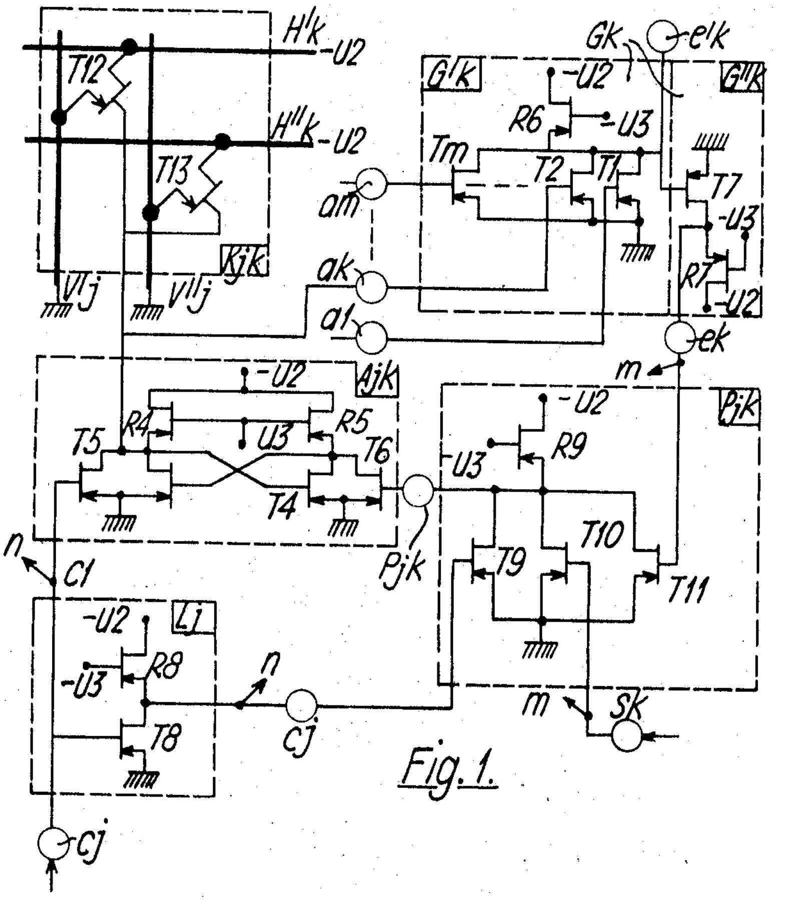
FIG. 1 illustrates the detailed diagram of a switching circuit and its associated circuits.

Before describing FIG. 1, the main features of the MOS transistors and their mode of operation will reviewed. All the transistors shown in FIG. 1 are of this type.

A MOS transistor is almost completely symmetrical and the electrodes which operate as drain and source may be inverted without any drawback and without modifying its operation when it is used as a logical circuit. Nevertheless, the manufacturer defines, in the specifications, the electrodes which operate as source and drain. Consequently, in the figures, the source is symbolized by an arrow as the emitter of a bipolar transistor.

In the operation of a MOS-Ph transistor (type P, enhancement transistor) the following voltages are defined:

*VI:* threshold voltage,

*VD:* drain voltage,

*VG:* grid voltage.

All these voltages being measured with respect to that of the source (*VS*=3) and expressed in absolute values, a MOS transistor is in its "high impedance off" or "blocked" state when $VG \leq VT$. It then has a drain-source resistor *RDS* of value practically infinite (approximately $10^7$ ohms).

A MOS transistor is conducting or "on " when $VG>VT$. It then behaves as a passive resistor of value $$RDS=\frac{1}{K\,(VG-VT)} \qquad (1),$$

*K* being a proportionality factor.

In this case, there are two "on" regions:

The "low impedance on" region (or nonsaturated region) when $VD<VG-VT$ with a drain-source resistance *RDS* of low value (50 to 200 ohms).

The "high impedance off" region (or saturated region) when $VD \geq VG-VT$ with a resistance *RDS* of relatively high value.

If a MOS-Ph transistor has a threshold voltage *VT*=-4 v. and if a voltage *VG*=0 is applied to it, it becomes blocked. If a voltage *VG*=-24 V. and a voltage *VD* ranging between zero and −20 volts is applied to it, it sets into the on state. In practice if a good linearity of the resistance *RDS* is required, one must use the lower values of *VD*. The resistance *RDS* of the transistor then has a very low value and it allows bidirectional transfer of analog or digital signals between drain and source.

The MOS transistors are also used as resistors, this enabling to manufacture large scale integrated circuits, this passive element operation may be obtained for both types of conduction. For instance, if the transistor operates in the low impedance on region with a suitable bias ($VD<VG-VT$ ) and if it is connected in series with an inverter MOS transistor, either the voltage *VD* or the ground voltage appears at the connection which is common to the two transistors according to whether the said inverter transistor is off ($VG \leq VT$) or on ($VG>VT$).

In the various figures accompanying the description, MOS transistors operating as active elements bear the reference T and those operating as load resistors bear the reference R. It is obvious that the use of MOS transistors as load resistors is only feasible when integrated technology is employed in which case they offer advantages from manufacturing point of view. However it is well understood that each MOS transistor bearing the reference R and used as resistor may be replaced by a conventional resistor of same value.

FIG. 1 illustrates the detailed diagram of a switching circuit X*jk* located at the cross-point of the vertical V*j* and of the horizontal H*k* of a multiselector comprising *m* verticals and *n* horizontals. Such a circuit X*jk* comprises the bidirectional cross-point K*jk*, its control circuit comprises the flip-flop A*jk* and the NOR-circuit P*jk*.FIG. 1 illustrates also the detailed diagram of a logical circuit G*k* associated to the horizontal H*k* and of the delay circuit L*j* associated to the vertical V*j*.

This switching circuit is controlled by a certain number of signals transmitted over the conductors *cj*, *c'j*, *sk*, *ek*, *pjk*, *ak*. The conductor *cj* is connected to the inverter circuit L*j* associated to the vertical V*j* and to the *n* flip-flops ... A*jk*... A*j*-*n*associated to the vertical V*j*.

The conductor *c'j* is connected to the *n* NOR-circuits P*jl* ... P*jk* ... P*jn* associated to the vertical V*j*. The conductor *sk* is connected to the *m* NOR-cicuits P*lk* jk associated to the horizontal H*k*. The conductor *ek*, coming out of the logical circuit G*k* associated to the horizontal H*k*, is connected to the *m* NOR-circuits P*lk* ... P*jk* ... P*mk* associated to the horizontal H*k*. The conductor *pjk*, coming out of the NOR-circuit P*jk*, is connected to the flip-flop A*jk*.

Table I indicates the various signals applied to the control conductors as well as the corresponding voltage levels and the designation of the signals. These signals bear the same references as the conductors to which they are applied, but the first letter is a capital one. For the purpose of simplification, the references of the conductors and signals do not bear, in this table, the letters *j*, *k* identifying the horizontal and the vertical to which each cell is associated. As it can be seen from this table a signal of amplitude −2 selection conductor *sk* characterizes the nonselection of the horizontal H*k*.

The cross-point K*jk*, located at the intersection of the horizontals H', H'' and of the verticals V', V'', carries out the connection between the conductors H'*k*–*V'j* and H''*k*–V''*j* when the MOS-Ph transistors T12 and T13 are in the on state. The control signal A*jk* applied to the grids of these transistors is supplied by the flip-flop bearing the same reference or the holding flip-flop which comprises the MOS-Ph transistors T3, T4, T5, T6, R4, and R5.

The mode of operation of such a flip-flop in which the transistors T5 and T6 are used to control the switching, is similar to that of a flip-flop equipped with bipolar transistors PNP and will not be described in detail.

TABLE I

| Conductor | | Signal | Voltage | Designation |
|---|---|---|---|---|
| | | $\overline{C}$ | 0 | |
| | *c* | | | |
| | | C | −U2 | Connection signal |
| | | $\overline{C'}$ | 0 | Delayed connection signal |
| | *c'* | | | |
| | | C' | −U2 | |
| | | $\overline{S}$ | 0 | |
| *s* | | | | |
| | | S | −U2 | Nonselection signal |
| | | $\overline{E}$ | 0 | |
| | *e* | | | |
| | | E | −U2 | Busy signal |
| | | $\overline{A}$ | 0 | |
| | *a* | | | |
| | | A | −U2 | Closing signal |
| | | $\overline{P}$ | 0 | |
| | *p* | | | |
| | | P | −U2 | Preselection signal |

Table II hereunder indicates the states of the transistors T3 and T4 according to whether the flip-flop is in the 1 or 0 state as well as the state of the cross-point K*jk* and the drain voltages of these transistors.

TABLE II

| State of the flipflop | State of the transistors | | State of the cross-point | Voltage levels | |
|---|---|---|---|---|---|
| | T3 | T4 | | Output *1* (Drain of T3) | Output $\overline{0}$ (Drain of T4) |
| *1* state | Blocked | Conducting | Closed | [1]−U2 | 0 |
| $\overline{0}$ state | Conducting | Blocked | Open | [2]0 | −U2 |

[1] Signal Ajk.
[2] Signal $\overline{Ajk}$.

The grids of the control transistors T5 and T6 are brought up either to the potential −U2 (logical conditions C*j*, P*jk* ) or the ground potential (logical conditions $\overline{Cj}$, $\overline{Pjk}$). It is seen that, for the logical condition C*j*, the transistor T5 is conducting and that the flip-flop A*jk* is reset in the 0 state (logical condition $\overline{Ajk}$) and that, for the condition P*jk*, it is set in the 1 state (logical condition A*jk*).

It will be noted that if the transistors T5 and T6 are simultaneously conducting by the application of the signals C*j* and P*jk*, the drains of the transistors T3 and T4 are both forced to the ground potential and the signal $\overline{Ajk}$ appears.

The logical circuit Gk comprises a NOR-circuit G'*k* comprising the MOS-Ph transistors T1, T2 ... T*m* connected in parallel and R6, and an inverter circuit G''*k* comprising the MOS-Ph transistors T7 and R7. The grids of the transistors T1 to T*m* are connected respectively to the output terminals of the flip-flops A*lk* to A*mk* of the horizontal H*k* so that the NOR-circuit G'*k* delivers, on the conductor *e'k*, a signal E'*k* of amplitude −U2 for the logical condition E'*k*=$\overline{\text{A}lk\text{+A}2k\text{+}...\text{+A}mk}$.

This signal E'*k* means that all the switching circuit associated to the horizontal H*k* are open: it will be called hereafter "free horizontal signal." In an achievement of large scale integrate circuits, the conductor *e'k* constitutes an output conductor of an elementary multiselector.

The inverter G''*k* delivers a signal E*k* of amplitude −U2 for the logical condition E*k*=A*lk*+A2*k*+...+A*mk;* this signal E*k* means therefore, according to table I, that at least one switching circuit associated to the horizontal H*k* is closed: it will be called hereafter the "busy state signal."

The inverter circuit L*j*, which comprises the MOS-Ph transistors T8 and R8, is identical to the circuit G''*k* and delivers signals $\overline{C'j}$ or C'*j* according to whether the signal transmitted by the vertical selection circuit *cj* is C*j* corresponding to the connection signal or $\overline{Cj}$. The switching time of the MOS transistor used to invert the signal has a value *t* and, for instance, when the connection signal is suppressed (shifting from the condition C*j* to the condition $\overline{Cj}$), the signal $\overline{C'j}$ remains still during a time *t*.

The NOR-circuit P*jk* which comprises the MOS-Ph transistors T9, T10, T11, R9 is identical to the circuit G'*k* and delivers a *preselection signal* p*jk* of amplitude −U2 for the logical condition: P*jk*=$\overline{\text{C}'j\text{+S}k\text{+E}k}$=$\overline{\text{C}'j}\cdot\overline{\text{S}k}\cdot\overline{\text{E}k}$. It is seen thus by referring to table I that the preselection signal P*jk* is only present when the three following conditions are simultaneously fulfilled:

The horizontal H*k* is free (condition $\overline{\text{E}k}$),

The horizontal H*k* is selected (condition $\overline{\text{S}k}$),

The delayed connection signal is present (condition $\overline{\text{C}'j}$).

The operation of the circuit of FIG. 1 will be now described in relation with table III. This description will be divided into two parts concerning respectively the effect of the control signals on a nonselected cell and a specific process for closing the switching circuit X*jk* located at the intersection of the vertical V*j* and the horizontal H*k*.

1. Nonselected cells

The lines 1.1, 1.2, 1.3 in table III indicate the signals and the voltages present over the conductors *c*, *c'*, *s*, *e*, and *p* (output terminal of NOR-circuit P*jk*, FIG. 1) in the following cases.

1.1 Rest state (table III, reference 1.1)

In the rest state, i.e., when neither the closing nor the opening K*jk* are controlled, signals $\overline{Cj}$ and S*k* are applied to the selection inputs as well as one of the signals $\overline{\text{E}k}$ or E*k*. The signal $\overline{Cj}$ blocks the control transistor T5 of the flip-flop A*jk* and the signals S*k* and C'*j* block the gate P*jk* so that the state of the flip-flop is held in position whatever the level of the voltage over the conductor *ek* may be.

It will be pointed out that if a signal $\overline{\text{S}k}$ is applied when the transistor T5 has been receiving a signal $\overline{Cj}$ for at least a time *t*, the signal C'*j* still blocks the gate P*jk*.

1.2 Application of a connection signal (table III, reference 1.2)

The application of a signal C*j* to the vertical selection conductor *cj* initiates the opening of all the cross-points associated to the vertical V*j*. In effect, this signal makes all the transistors T5 conducting and the flip-flops A are reset in the 0 state. the line 1.2 of table III represents the various voltages in the case of nonselected horizontals (signal S).

1.3 Application of a selection signal (table III, reference 1.3)

When the horizontal H*k* is selected by the application of a signal $\overline{\text{S}k}$, the nonselected verticals receive a signal $\overline{\text{C}}$ and it can be seen that each gate P remains blocked provided that the signal C should be applied for at least a time *t* before the application of the signal $\overline{Sk}$.

TABLE III

| Ref. | Operation | Conductors *c* | *c'* | *s* | *e* | *P* | Flip-flop A |
|---|---|---|---|---|---|---|---|
| 1.1 | Rest | $\overline{Cj}$ (0) | C'j (−U2) | Sk (−U2) | $\overline{Ek}$ ou Ek | $\overline{Pjk}$ | |
| 1.2 | Vertical half connection | C (−U2) | C' (0) | S (−U2) | E ou $\overline{\overline{E}}$ | $\overline{P}$ | → $\overline{A}$ |
| 1.3 | Horizontal half connection | $\overline{\overline{C}}$ (0) | C' (−U2) | $\overline{\overline{S}}$ (0) | E ou $\overline{\overline{E}}$ | $\overline{P}$ | |
| 2.1 | Horizontal selection | $\overline{Cj}$ (0) | C'j (−U2) | $\overline{Sk}$ (0) | $\overline{Ek}$ (0) | $\overline{Pjk}$ | |
| 2.2 | Vertical selection | Cj (−U2) | C'j (0) | $\overline{Sk}$ (0) | Ek (0) | Pjk | → $\overline{Ajk}$ |
| 2.3a | Closing | $\overline{Cj}$ (0) | $\overline{C'j}$ (0) | $\overline{Sk}$ (0) | $\overline{Ek}$ (0) | Pjk | → Ajk |
| 2.3b | Holding | $\overline{Cj}$ (0) | C'j (−U2) | $\overline{Sk}$ (0) | Ek (−U2) | $\overline{Pjk}$ | |

2. Closing of a cross-point

By way of nonlimitative example, a process for closing the circuit X*jk* will be now described by assuming that initially the voltages applied are those corresponding to the rest state (table III, reference 1.1) and that the horizontal H*k* is free, i.e., that a signal $\overline{Ek}$ is present over the conductor *ek*. This closing process comprises the following operations carried out in time succession:

2.1 Horizontal selection (table III, reference 2.1)

A signal $\overline{Sk}$ is applied to the conductor *sk*. As a signal C'*j* is present, the gate P*jk* is blocked and the flip-flop A*jk* does not switch.

2.2 Vertical selection

A signal C*j* is applied to the conductor so that the flip-flop A*jk* is reset in the O state (condition $\overline{Ajk}$). After a delay *t*, the circuit L*j* delivers a signal $\overline{C'j}$ and, if the horizontal is free, this being characterized by a signal $\overline{Ek}$, a signal P*jk* appears so that the drains of the transistor T3 and T4 are both grounded (table III, reference 2.2). The transistors T12 and T13 (FIG. 4) are blocked and the cross-point is still open (condition $\overline{Ajk}$).

2.3 Closing of the cross-point

The signal C*j* is suppressed (condition $\overline{Cj}$) but the signal $\overline{C'j}$ is still present during a time *t*. The transistor T3 is therefore blocked whereas the transistor T4 remains conducting under the control of the signal P*jk* (table III, reference 2.3*a*).

Consequently the flip-flop A*jk* is set in the 1 state (condition A*jk*) making the transistors T12, T13 conducting: the cross-point is closed and a signal E*k* appears which blocks the gate P*jk* (signal $\overline{Pjk}$). After a time *t*, it appears also a signal C'*j* (table III, reference 2.3*b*): the cross-point is held in the closed position.

2.4 End of operation

The signal $\overline{Sk}$ is suppressed (condition S*k*) and the device is in the rest position (table III, reference 1.1).

FIG. 2 illustrates a multiselector with *m* verticals and *n* horizontals which allows to connect a circuit 1 comprising *n* output conductors to a circuit 2 comprising *m* input conductors. The *n* output conductors of the circuit 1 are connected to the horizontals H1 to H*n* and the *m* output conductors of the circuit 2 are connected to the verticals V1 to V*m*. On this FIG. 2, one has shown the various switching circuits X*jk* of FIG. 1 by squares from which go out conductors *cj*, *c'j*, *sk*, *ak* previously defined. One has also represented the various circuits G*k* to which are connected the *m* conductors *ak* of a horizontal. As it has been seen previously, this circuit G*k* comprises a NOR-circuit G'*k* the output conductor of which *e'k* is, in the case of a multiselector for switching network, connected to an output terminal of the multiselector. A signal E'*k* of amplitude −U2 appears for the logical condition $E'k=\overline{A1k+A2k+...+Am\,k}$, thus meaning that all the cross-points of the horizontal *k* are open. According to the present invention, the conductor *e'k* is connected to the conductor *sk*+1 of the following horizontal. Thus, *e'*1 is connected to *s*2, *e'*2 to *s*3...*e'n*−1 to *sn*; the first conductor *s*1 is connected to the flip-flop 3 identical to the flip-flop A*jk* of the FIG. 1, i.e., to the drain of the transistor T3.

Figures 3A, 3B, 3C, 3D:
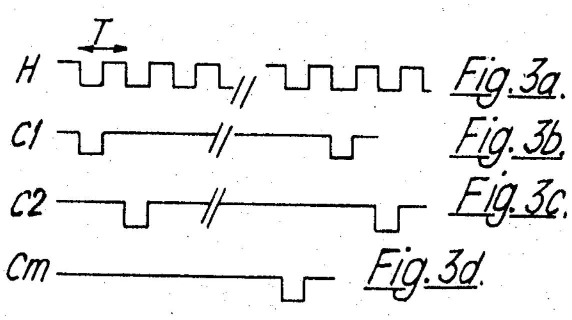

The conductors *cj* are connected to the circuit 4 which delivers signals C*j* defined by the diagrams of the FIGS. 3*b* to 3*d*; these signals are constituted by negative pulses of amplitude U2 obtained by division by *m* of the clock H of the diagram of the FIG. 3*a*.

The signal C1 is also applied to the flip-flop 3 (grid of the transistor T5) through an AND circuit open by a signal ST the duration of which is equal to *m* periods T of the clock signal H if it is required to carry out one single scanning cycle of the outputs of the circuit 1. The flip-flop 3 receives also the signal C2 applied to the grid of the transistor T6.

The mode of operation of this scanning circuit is the following assuming that at the beginning all the cross-points are open. When the signal $\overline{ST}$ is applied to the AND-circuit 5, the first pulse of the signal $\overline{C1}$ resets the flip-flop 3 to the 0 state so that the conductor *s*1 receives a signal $\overline{S1}$. The conductor *c*1 receives also a signal C1 and when it disappears, the cross-point K11 closes and connects the horizontal H1 to the vertical V1. A busy state signal $\overline{E'1}$ appears over the conductor *e'*1 and is applied to the selection conductor *s*2. This signal $\overline{E'1}$ corresponds to a selection signal of the horizontal H2 so that when the first pulse of the signal C2, applied to the connection conductor *c*2, disappears, the cross-point K22 closes. The signal C2 is also applied to the flip-flop 3 to set in the 1 state and it delivers then a voltage level −U2 which corresponds to a nonselection signal.

The cross-points K33, K44... K*mm* are thus closed by turns during the occurrence of each first pulse of the signals C3, C4... C*m*. The pulse following the first pulse of the signal C*m* is the second pulse of the signal C1 which opens all the cross-points of the vertical V1 (table 111, reference 1.2) and in particular the cross-point K11. When this second pulse of the signal C1 disappears, the cross-point K1*m*+1 closes and the NOR-circuit G'1 delivers a signal E'1 which, applied to the conductor *s*2, corresponds to a nonselection signal. Thus, when the second pulse of the signal C2 is applied to the conductor C2, the cross-point K22 opens whereas the cross-point K2*m*+2 closes. There are then *m* cross-points closed simultaneously thus allowing to connect *m* of the *n* outputs of the circuit 1 to the *m* outputs of the circuit 2.

When the cross-point K*mn* closes, the NOR-circuit G'n delivers a signal $\overline{E'}n$ over the conductor *e'n*; if this conductor *e'n* is connected to the selection closed conductor *s*1, the following pulse of the signal C1 opens the cross-point closed by the preceding pulse of the signal C1 and closes the cross-point K11: a new scanning cycle thus begins. If the conductor *e'n* is not connected to the selection conductor *s*1, the *m* cross-points of the *m* last horizontals open if one keeps on applying the signals C1 to C*m* to the connection conductors; a new scanning cycle can take place only if the signal ST appears.

The operation of the circuit of FIG. 2 shows the existence of *m* simultaneous links between the circuits 1 and 2, these *m* links corresponding to *m* successive outputs among the *n* of the circuit 1. One may thus consider the circuit of FIG. 2 as the equivalent of *m* scanning circuits of conventional type operating in parallel.

The invention has been described in the case of a scanning circuit comprising a multiselector of *n* horizontals and *m* verticals, however it is understood that a multiselector may be achieved by the grouping of several elementary multiselectors comprising for instance each one two horizontals and four verticals. By grouping such elementary multiselectors, one may, or instance, obtain a multiselector with 256 horizontals and four verticals; each vertical is thus connected to 256 horizontals, this introducing a problem of parasitic capacity. In order to avoid this drawback, it is proposed to achieve the scanning circuit in two stages as shown on FIG. 4. The first stage comprises eight multiselectors M1 to M8 each one comprising 32 horizontals and four verticals. The horizontals, shown in thin line, are connected to the 256 outputs of the circuit 1. The four verticals, also represented in thin line, are connected to the horizontals of the multiselector M′ constituting the second stage; this multiselector is identical to the preceding ones and its four verticals are connected to the circuit 2.

The control conductors of the various multiselectors have been represented in thick line. Thus, in each multiselector, one has shown the conductor *e*′ of each horizontal which is connected to the selection conductors of the following horizontal. However, this connection is interrupted every four horizontals and the corresponding selection conductor is connected to one of the output conductor A1 to A8 of the decoding circuit D1, in the case of the multiselectors M1 to M8, and to one of the output conductors B1 to B8 of the decoding circuit D2, in the case of the multiselector M′. The decoding circuit D2 is associated to a counter *Cp*2 receiving the pulses from the signal C1 of the FIG. 3*b*; the decoding circuit D1 is also associated to a counter *Cp*1 receiving the pulses from a signal K′ obtained by division by eight of the pulses of the signal C1. The output conductors of the decoding circuit D1 and D2 can be activated only if they receive a signal ST. When an output conductor of a decoding circuit is activated, it supplies a voltage level equal to the ground. The connection conductors *c*1 to *c*4 of the multiselector M′ are connected to a circuit 8 which delivers the signals C1 to C4 and K′. In the absence of the signal ST, this circuit does not supply any signal.

The operation of the circuit is the following assuming that all the cross-points of the multiselectors are opened and that the code displayed by the counters *Cp*1 and *Cp*2 corresponds to the activation respectively of the wires A8 and B8. The first pulses which appear after the signal ST are a pulse of the signal C1 and a pulse of the signal K′. The pulse of the signal C1 activates, on the one hand, the connection conductor *c*1 of the multiselector M′ and, on the other hand, the selection conductor S′1 through the counter *Cp*2 and the decoder D2. Therefore, the first cross-point of the first horizontal closes; the signal $\overline{E'1}$ is applied, on the one hand, to the selection conductor *s*′2 *of the second horizontal and, on the other hand, to the connection conductor c*1 of the multiselector M1. This conductor *c*1 was previously at the voltage level −U2 which corresponded to a connection signal; at the same time, the selection signal is applied to the conductor *s*1 through the conductor A1 of the decoder D1; thus, when the condition $\overline{E'1}$ appears, the cross-point of the horizontal H1 closes. The two closed cross-points of the multiselectors M1 and M′ allow to connect the horizontal J1 to the vertical V1 and to have a link between the circuits 1 and 2.

The pulse of the signal C2 (FIG. 3*c*) is applied to the conductor *c*2 of the multiselector m′ and closes in a first stage the cross-point corresponding to the second horizoinal, then in a second stage the cross-point of the second horizontal of the multiselector M1. The four cross-points of the first four horizontals of the multiselectors M′ and M1 close thus by turns so that after the pulse of the signal C4, four links exist between the circuits 1 and 2.

The pulse of the signal C1 which appears afterwards opens the cross-point of the first horizontal of the multiselector M′ and steps it up by one position the counter *Cp*2 so that the conductor B2, connected to the selection conductor *s*′5 is activated. The closing of the cross-point gives rise to a signal E′1 which opens the cross-point of the horizontal H1 of the multiselector M1. When the pulse of the signal C1 disappears, the cross-point of the fifth horizontal of the multiselector M′ closes, which initiates the closing of the cross-point of the horizontal H33 of the multiselector M2.

The cross-points of the horizontals H33 to H36 of the multiselector M2 close thus by turns whereas the homologous cross-points of the horizontal H1 to H4 for the multiselector M1 open. These simultaneous closings and openings of the cross-points of the first four horizontals of the multiselectors M1 to M8 take place by turns at the rate of the pulses of the signals C1 to C4 applied to the connection conductors of the multiselector M′.

The ninth pulse of the signal C1 activates the conductor B1 of the decoding circuit D2, and at the same time, the second pulse of the signal K′ activates the conductor A2 of the decoding circuit D1. Therefore, the closing and opening operations will be carried out by turns on the horizontals 5 to 8 of the multiselectors M1 to M8.

When the signal ST disappears, the selection conductors no longer receive signals and the four closed cross-points open at the rate of the pulses of the signals C1 to C4.

While the principles of the above invention have been described in connection with specific embodiments and particular modifications thereof, it is to be clearly understood that this description is made by way of example and not as a limitation of the scope of the invention.

In particular, opposite polarity transistors may be used by inverting the polarities of the power supply sources.

We claim:

1. An electronic scanning circuit for setting up electronic multiselectors comprising
- a matrix of *m* verticals and *n* horizontals to which are associated vertical and horizontal selection conductors *cj* and *sk*,
- means for selecting a vertical *j* by applying a connection signal *Cj* over the associated vertical conductor *cj*, and
- means for selecting a horizontal *k* by applying a horizontal connection signal $\overline{Sk}$ over the conductor *sk*,
- a plurality of switching circuits, coupled at the juncture of said vertical and horizontal selection conductors,
- each circuit including a contact element formed by a MOS transistor,
- each transistor including grid and source and drain electrodes,
- means coupling said source and drain electrodes across said conductors to be coupled,
- a holding flip-flop formed by MOS transistors as part of each switching circuit,
- means connecting the 1 output of each flip-flop to the grid of the associated transistor which serves as the contact element, whereby the transistor conductors when the flip-flop is in the 1 state and is blocked when the flip-flop is in the 0 state, and
- a logic circuit coupled to respond to the condition of a plurality of the flip-flops to provide a free horizontal signal when the flip-flops are in their 0 state indicating all the horizontal circuits are open, and
- means coupling the free horizontal signal to the selection conductor *sk*+1 in the horizontal *k*+1.

2. An electronic scanning circuit as claimed in claim 1, in which
- means are provided to reset the flip-flop to the 0 state by the application of a connection signal C on its 0 output, and
- means are provided for setting the flip-flop to its 1 state by the application of a signal P from an electronic gate,
- said electronic gate in turn providing the signal P in response to simultaneous receipt of a signal C′, a selection signal $\overline{S}$ and a signal $\overline{E}$.

3. An electronic scanning circuit as claimed in claim 1, in which the matrix comprises
- *m* delay conductors associated with the verticals,
- the delay conductors producing a signal $\overline{C'j}$ delayed by an amount of time *t* relative to the signal *Cj* appearing on the conductor *c*′*j* associated with the vertical *j*,
- *n* busy state conductors associated with the horizontals,
- the busy state conductors carrying a signal E*k* on the conductor *ek* associated with the horizontal *k* when one of the switching circuits is closed on the said horizontal, and
- *n* free horizontal conductors associated with the horizontals;

4. An electronic scanning circuit as claimed in claim 1, in which a free horizontal conductor $e'k$ associated with the horizontal $k$ is connected to a selection conductor $sk+1$ of the horizontal $k+1$.

5. An electronic scanning circuit as claimed in claim 1, in which identical series of pulses shifted with respect to time are supplied to the selection conductors associated with the respective verticals.

6. An electronic scanning circuit as claimed in claim 1, in which the selection conductor associated with the first horizontal receives, at the beginning of each scanning cycle, a selection signal $\overline{S1}$.

7. An electronic scanning circuit as claimed in claim 1, in which a free horizontal conductor $e'n$, associated with the last horizontal $n$, is connected to the selection conductor associated with the first horizontal.

* * * * *